United States Patent
Shen et al.

(10) Patent No.: US 11,319,002 B1
(45) Date of Patent: May 3, 2022

(54) STRUCTURE IMPROVEMENT OF AUTOMOBILE SPOILER

(71) Applicants: Jia-Li Shen, Taipei (TW); Jun-Hong Ye, Kaohsiung (TW)

(72) Inventors: Jia-Li Shen, Taipei (TW); Jun-Hong Ye, Kaohsiung (TW)

( * ) Notice: Subject to any disclaimer, the term of this patent is extended or adjusted under 35 U.S.C. 154(b) by 0 days.

(21) Appl. No.: 17/134,120

(22) Filed: Dec. 24, 2020

(51) Int. Cl.
*B62D 35/00* (2006.01)
*B62D 35/02* (2006.01)

(52) U.S. Cl.
CPC .......... *B62D 35/005* (2013.01); *B62D 35/02* (2013.01)

(58) Field of Classification Search
CPC ............................. B62D 35/005; B62D 35/02
USPC ........................................... 296/180.1, 180.2
See application file for complete search history.

(56) References Cited

U.S. PATENT DOCUMENTS

| | | | | |
|---|---|---|---|---|
| 6,644,700 B2* | 11/2003 | Ito | ............................ | B60R 19/48 293/117 |
| 2004/0135383 A1* | 7/2004 | Ariga | ....................... | B60R 19/18 293/117 |
| 2014/0015277 A1* | 1/2014 | Beedle | ................. | B62D 35/001 296/180.2 |
| 2015/0145280 A1* | 5/2015 | Kabbes | ................ | B62D 35/005 296/180.1 |
| 2015/0210324 A1* | 7/2015 | Kojima | ................ | B62D 35/005 296/180.1 |
| 2021/0129781 A1* | 5/2021 | Whitehead | ............ | B60R 19/445 |

* cited by examiner

*Primary Examiner* — Jason S Daniels

(57) ABSTRACT

A structure improvement of automobile spoiler, comprising a midsection, a right section and a left section; its features are: the spoiler of the present invention can be separated into a midsection, a right section and a left section, various parts and components can be buckled up to form one piece, after buckle combination, the parts are fastened by wood screws to form an integrated spoiler, when it is broken by collision, only the broken part is changed, the replacement cost is reduced, and the present invention can be split up, the size of the box for loading the present invention is reduced, more convenient for transportation, and the box cost is reduced.

1 Claim, 12 Drawing Sheets

STRUCTURE IMPROVEMENT OF AUTOMOBILE SPOILER

TECHNICAL FIELD

The present invention relates generally to a structure improvement of automobile spoiler, and more particularly to a buckle structure which can be presented by separately designed single part structure and has quick assembly and simple buckle assembly, so as to save the transportation cost, it does not take much space during transportation, and the damaged part can be changed individually. It is a particular and innovative invention with economic benefit.

TECHNICAL BACKGROUND

General automobile spoiler 1 structure is designed in one piece (as shown in FIG. 1), but when a collision happens occasionally, there will be breakage 101 (as shown in FIG. 3) or damage of a part or a corner. Regardless of the level of damage, the entire structure must be changed as it is designed in one piece, so that the consumer expenditure is increased. In order to save cost, some consumers will not change it immediately or until the damage area gets larger, leading to insufficient esthetics of overall automobile appearance, insufficient safety or unpredictable circumstances. Furthermore, due to integrated shaping, when the consumers buy the spoiler from a shop or by post, as the spoiler 1 is long, it is inconvenient for consumers to carry with, or the suppliers need a larger box 2 for loading the large sized spoiler 1 before delivery (as shown in FIG. 2), the mailing cost is relatively high. Therefore, the circle shall aim to save the consumers' replacement cost, or increase the consumers' willingness to change, and to save the mailing cost or facilitate pickups.

In view of this, the inventor of the present invention probed into the aforesaid demand according to years' experience in research and development in related domains, and sought for a solution according to the aforesaid demand. The present invention was finally completed through a long study and multiple tests, so as to remedy the existing defects and enhance the progressiveness and practicability.

SUMMARY OF INVENTION

Therefore, the primary objective of the present invention is to provide a "structure improvement of automobile spoiler", providing an easily assembled buckle combined structure, so that the integrally molded long and large object is changed into an assembled structure of separate parts, when a part of spoiler is broken or destroyed by collision, the single part can be changed instead of the whole structure, so as to save the cost for consumers.

The secondary objective of the present invention is to provide a "structure improvement of automobile spoiler", providing a spoiler structure with a plurality of single parts which can be easily assembled, so that the size of the packing box can be reduced, convenient and safe for the consumers to pick up, and the suppliers' mailing cost is reduced.

The present invention provides A structure improvement of an automobile spoiler, comprising:

a midsection, a right section, and a left section, wherein the midsection is cambered, wherein one side edge of a long side of the midsection has a first smooth cambered surface, wherein the other side edge of the long side of the midsection is located on the opposite to the first smooth cambered surface and has a plurality of holes for buckling on the vehicle body, wherein a right end of the midsection has a right sheet, wherein the right sheet has a plurality of right buckle holes, wherein a left end of midsection has a left sheet, wherein the right sheet is symmetrical to the right sheet and located at a right end of the midsection, wherein the left sheet has a plurality of left buckle holes, wherein the right section is cambered, wherein one side edge of a long side of the right section has a second smooth cambered surface, wherein the second smooth cambered surface is engageable with the first smooth cambered surface of midsection in an integrated manner, wherein the other side edge of the long side of the right section is located on the opposite to the second smooth cambered surface and has a plurality of holes for buckling on the vehicle body, wherein a lower part of a left end of the right section has a plurality of right cylinders, wherein a hole is provided in a center of the plurality of right cylinders, wherein the plurality of right cylinders is insertable in a buckle hole in the first sheet of the midsection so that the first sheet of the midsection is put at a bottom surface of the right section, wherein the left section is arranged symmetrically to the right section, wherein one side edge of a long side of the left section has a third smooth cambered surface, wherein the third smooth cambered surface is engageable with the first smooth cambered surface of the midsection in an integrated manner, wherein the other side edge of the long side of the left section is located on the opposite to the third smooth cambered surface and has a plurality of holes for buckling the vehicle body, wherein a lower part of a right end of the left section has a plurality of left cylinders, wherein a hole is provided in a center of the plurality of left cylinders, wherein the plurality of left cylinders is insertable in the buckle hole in the first sheet of the midsection so that the first sheet of the midsection is put at a bottom surface of the left section.

EMBODIMENTS

To further clarify the purpose, effect and structural feature of the present invention, the following preferred embodiments are given and described with figures.

Figure 1:
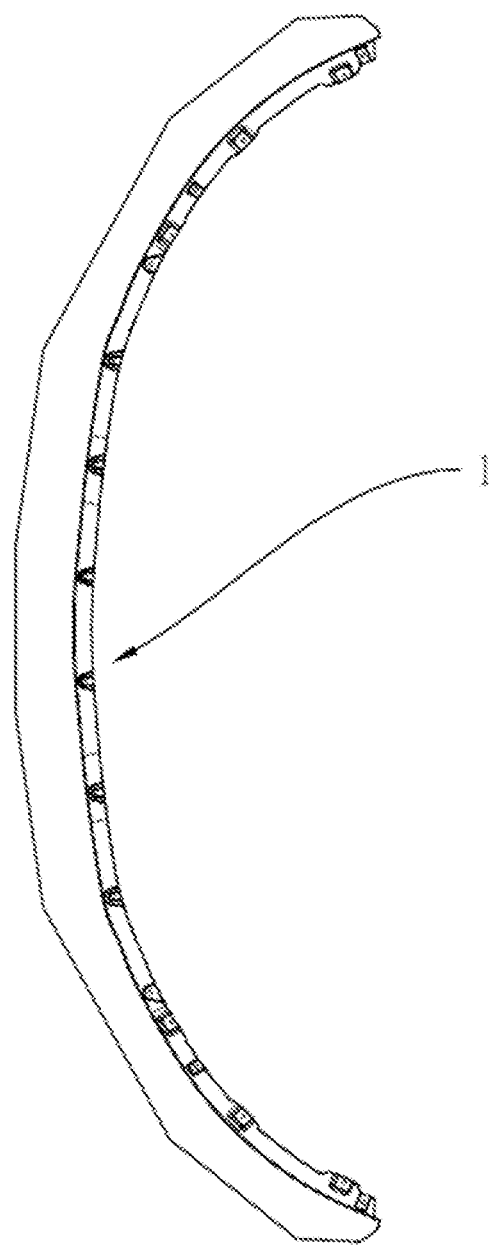
FIG. 1: Top view of the known integrally formed spoiler.
Figure 2:
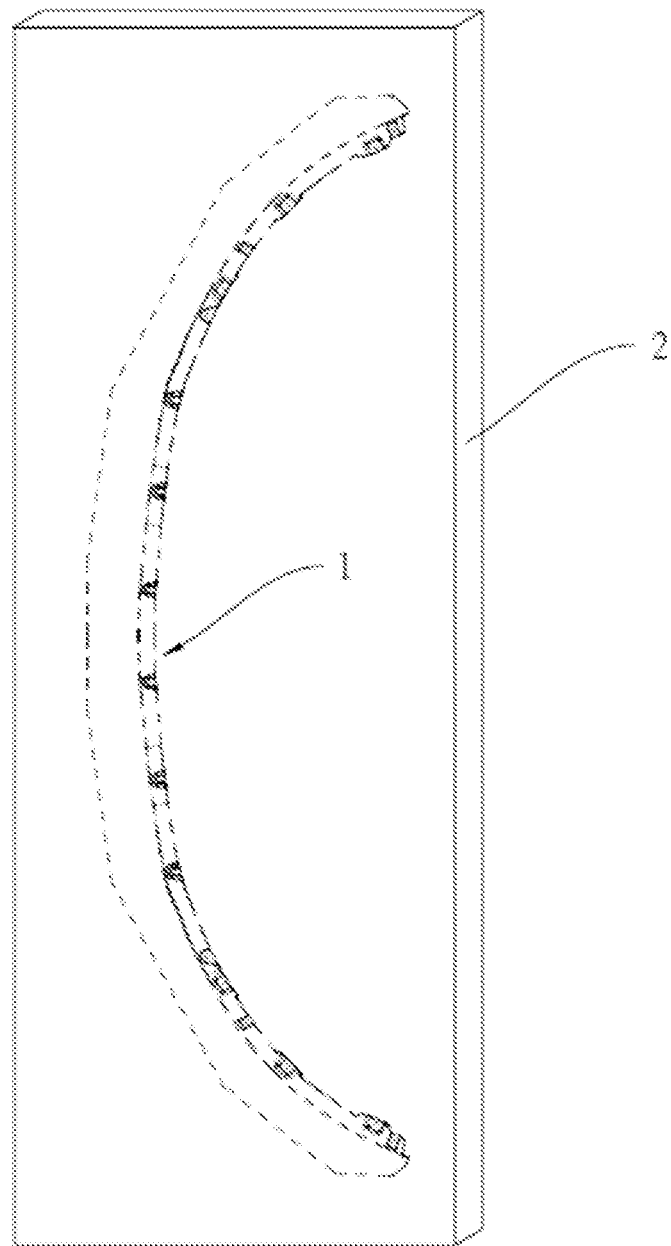
FIG. 2: Schematic diagram of the known integrally formed spoiler packed in transportation.
Figure 3:
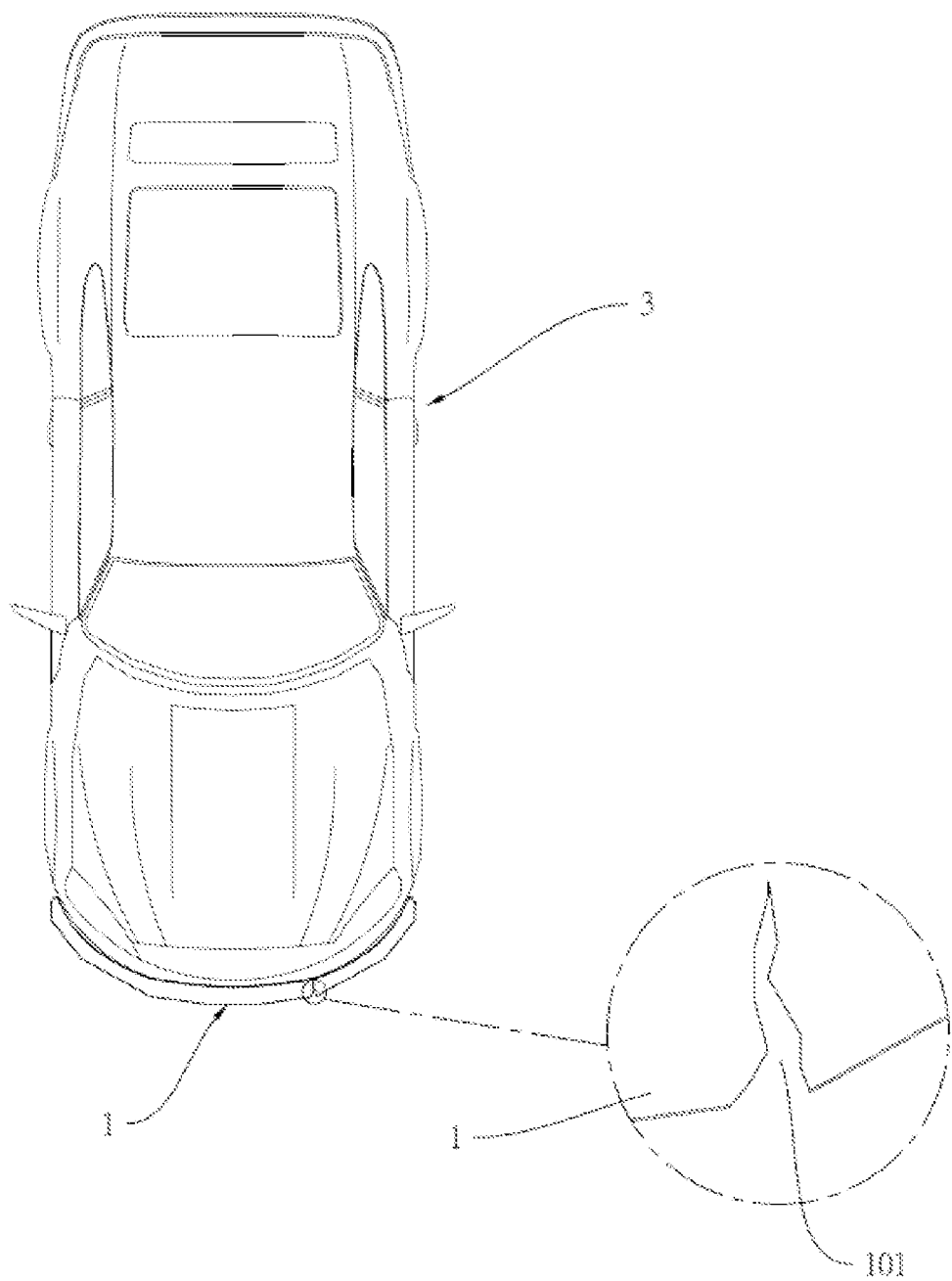
FIG. 3: Schematic diagram of the known integrally formed spoiler in operating state.
Figure 4:
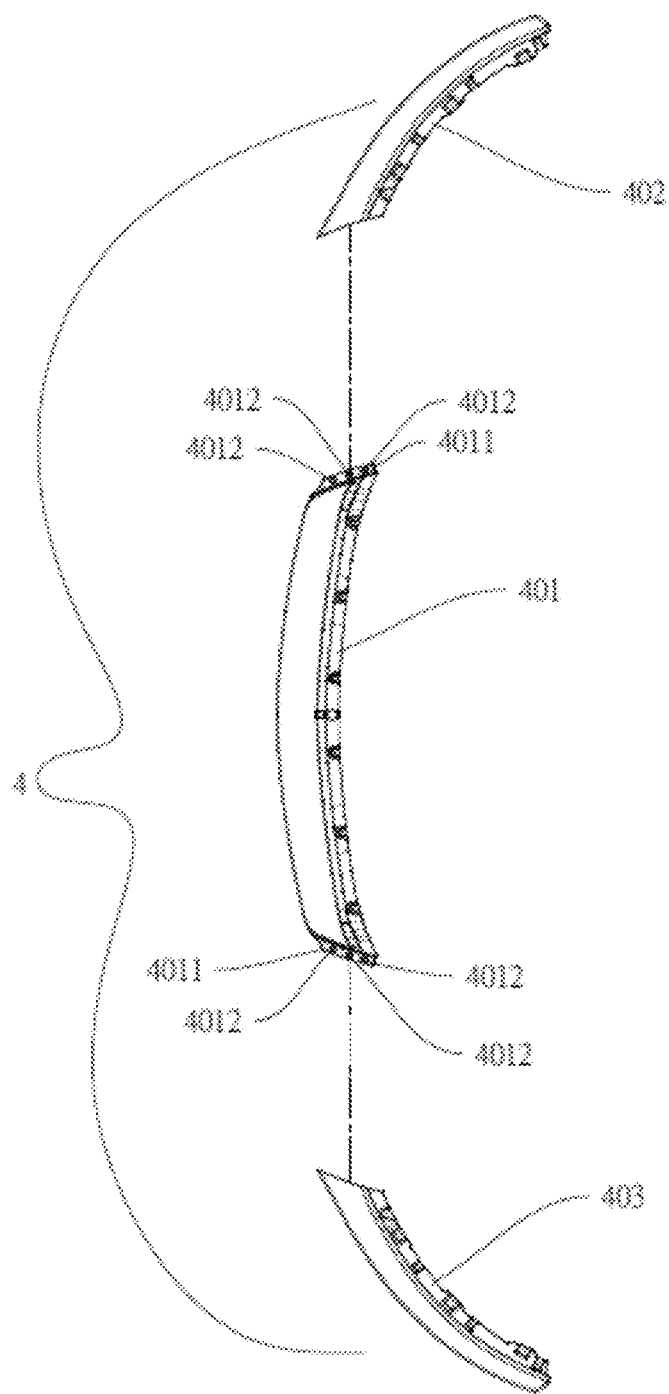
FIG. 4: Exploded top view of the spoiler of the present invention.
Figure 5:
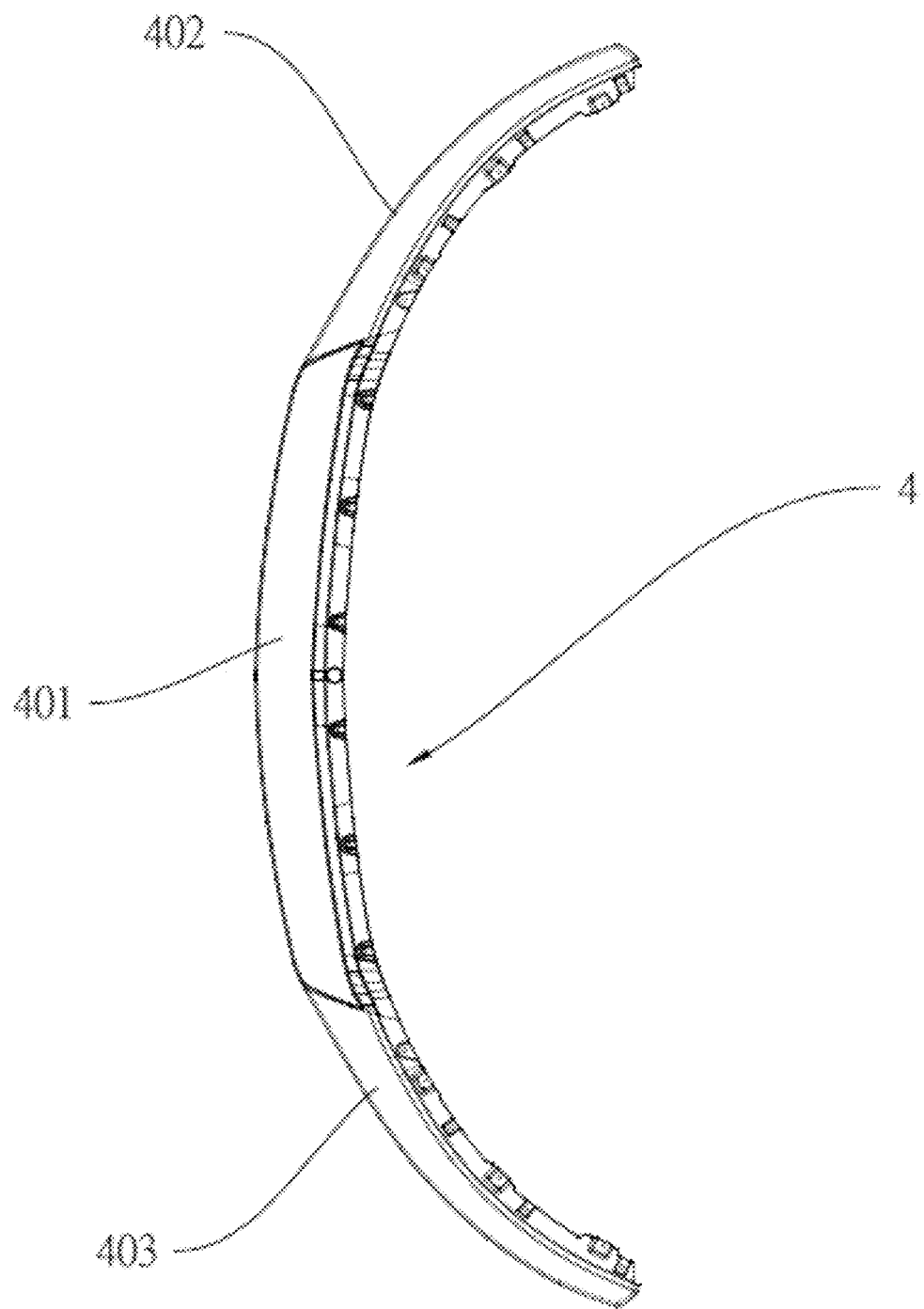
FIG. 5: Combined top view of the spoiler of the present invention.
Figure 6:
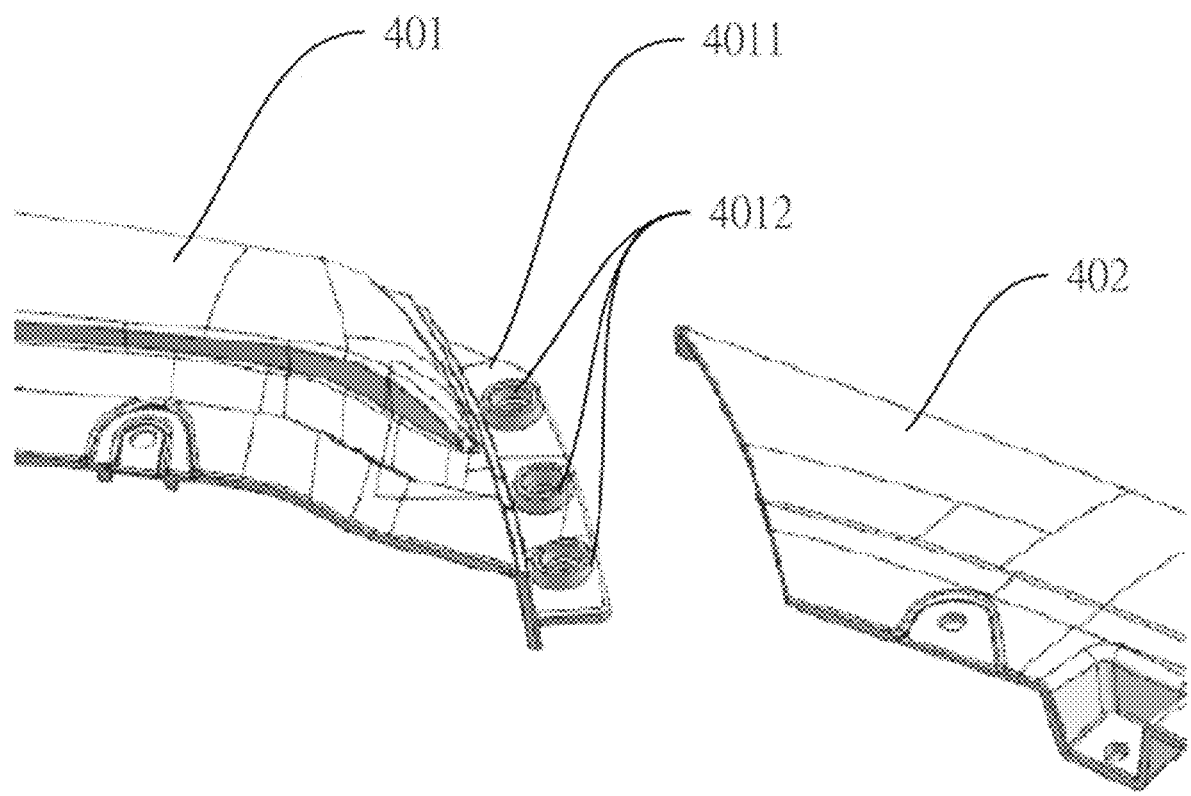
FIG. 6: Partial three-dimensional diagram of the spoiler of the present invention in buckle assembly.

As shown in FIG. 4 and FIG. 5, the present invention relates generally to a structure improvement of automobile spoiler, comprising a midsection 401, a right section 402 and a left section 403, wherein The midsection 401 is cambered, one side edge of the long side thereof has a smooth cambered surface, the other side of the side opposite to the smooth cambered surface has a plurality of holes for buckling on the vehicle body. As shown in FIG. 6, the right end of the midsection 401 has a sheet 4011, the sheet 4011 has a plurality of buckle holes 4012, and the left end of midsection 401 has a sheet 4011 symmetrical to that at the right end, the sheet 4011 has a plurality of buckle holes 4012.

Figure 7:
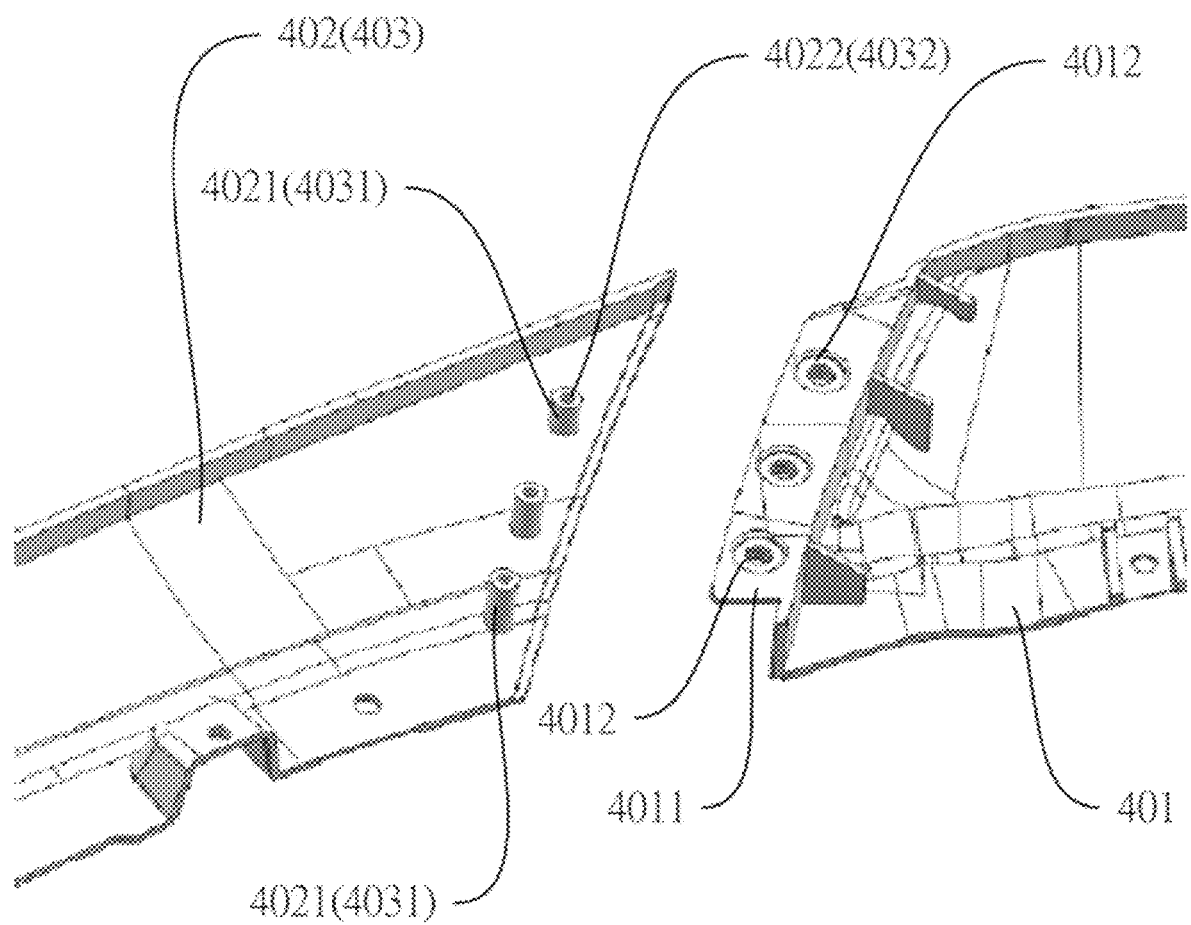
FIG. 7: Upward view of FIG. 6.
Figure 8:
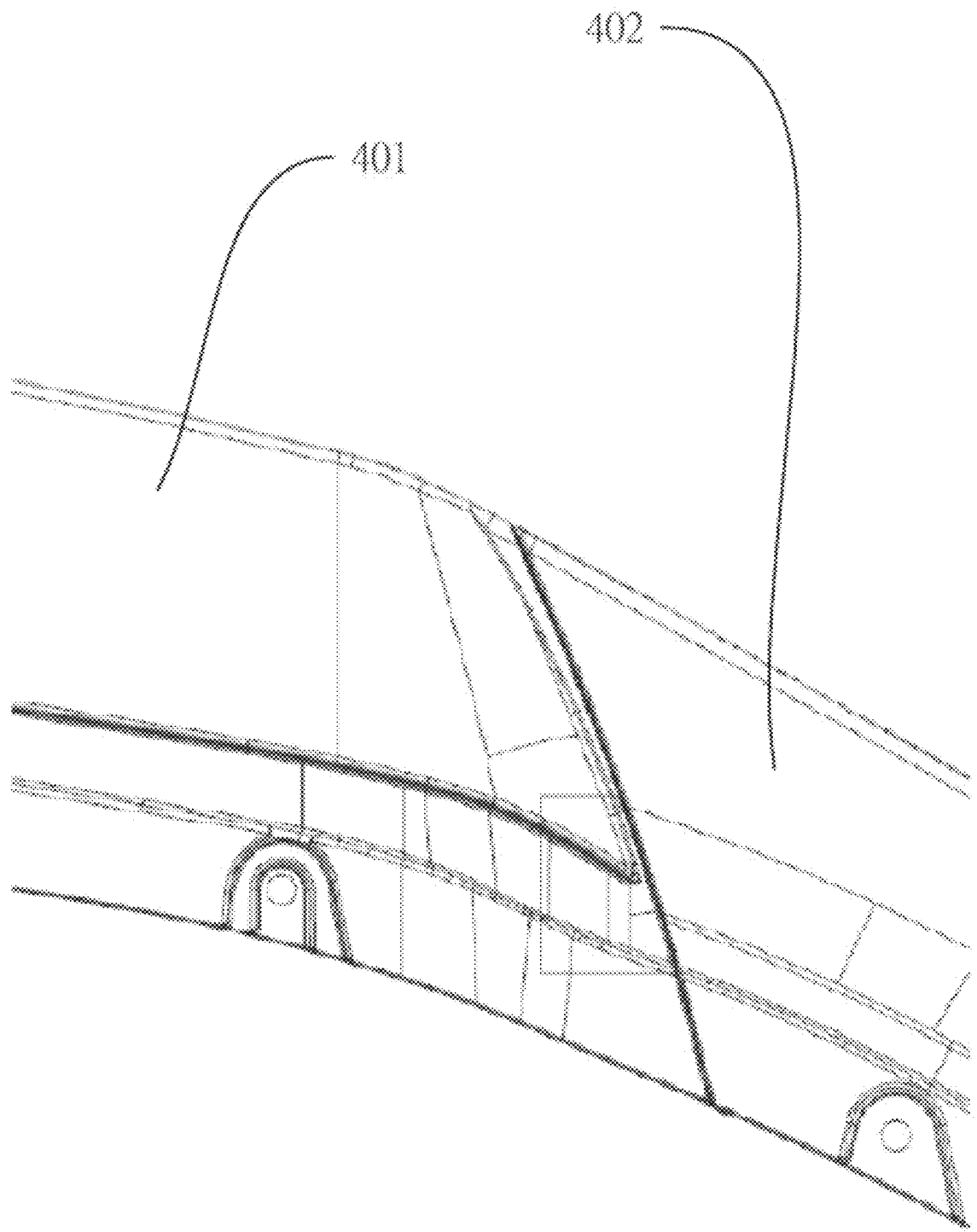
FIG. 8: Top view after buckle combination of FIG. 6.
Figure 9:
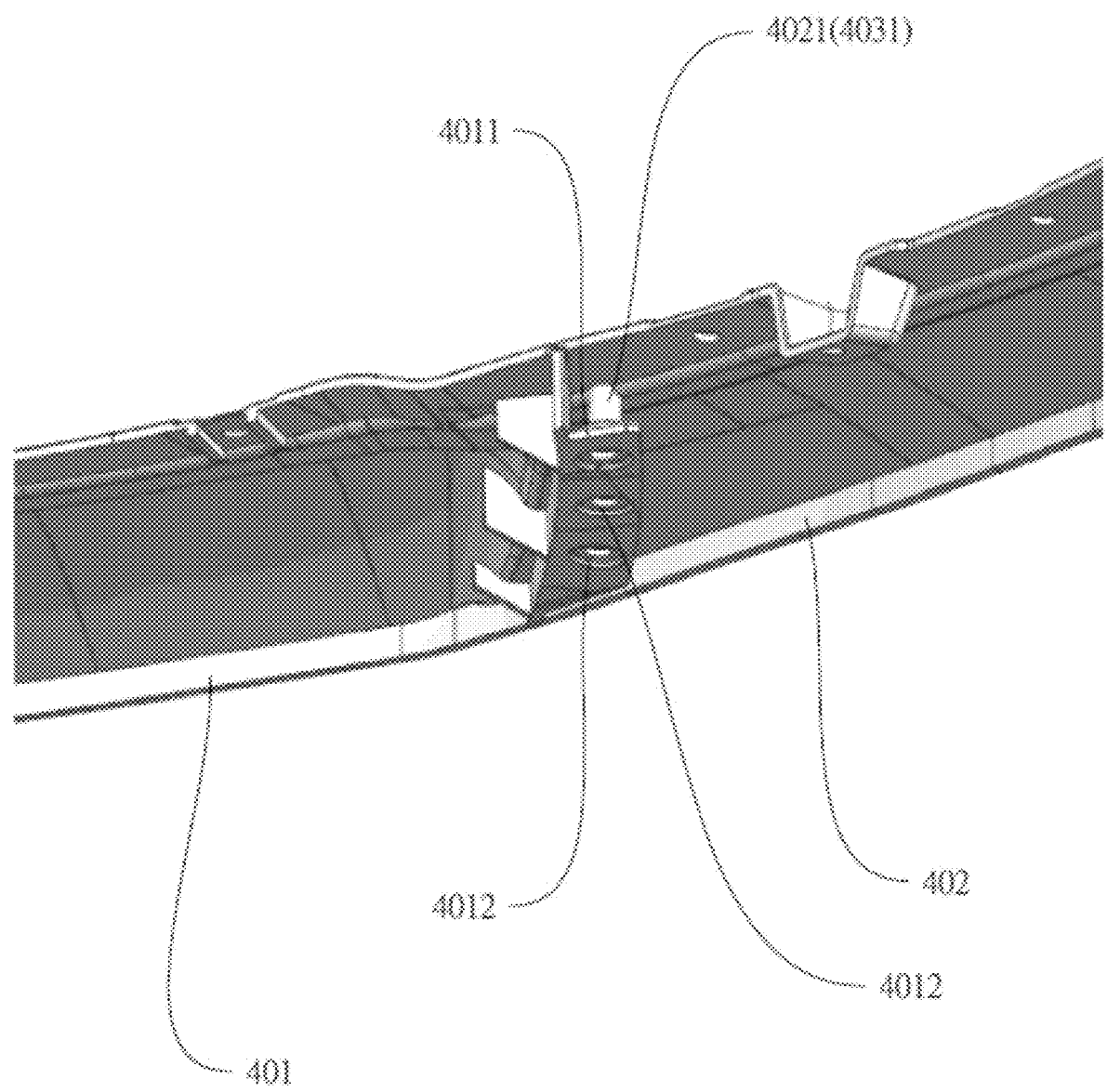
FIG. 9: Upward view after buckle combination of FIG. 8.

The right section 402 is cambered, one side edge of the long side thereof has a smooth cambered surface, the smooth cambered surface can be integrated with the smooth cambered surface of midsection 401. The other side of the side opposite to the smooth cambered surface has a plurality of holes for buckling on the vehicle body. As shown in FIG. 6 and FIG. 7, the lower part of left end of right section 402 has a plurality of cylinders 4021, there is a hole 4022 in the center of the cylinder 4021, and the cylinder 4021 can be inserted in the buckle hole 4012 in the sheet 4011 of midsection 401, so that the sheet 4011 of the midsection 401 is put at the bottom surface of right section 402 (as shown in FIG. 8 and FIG. 9).

The overall structure of left section 403 and the overall structure of right section 402 are arranged symmetrically, one side edge of the long side thereof has a smooth cambered surface, the smooth cambered surface can be integrated with the smooth cambered surface of midsection 401. The other side of the side opposite to the smooth cambered surface has a plurality of holes for buckling on the vehicle body, as shown in FIG. 6 and FIG. 7, the lower part of right end of left section 403 has a plurality of cylinders 4031, there is a hole 4032 in the center of the cylinder 4031. The cylinder 4031 can be inserted in the buckle hole 4012 in the sheet 4011 of midsection 401, so that the sheet 4011 of the midsection 401 is put at the bottom surface of left section 403 (as shown in FIG. 8 and FIG. 9).

Figure 10:
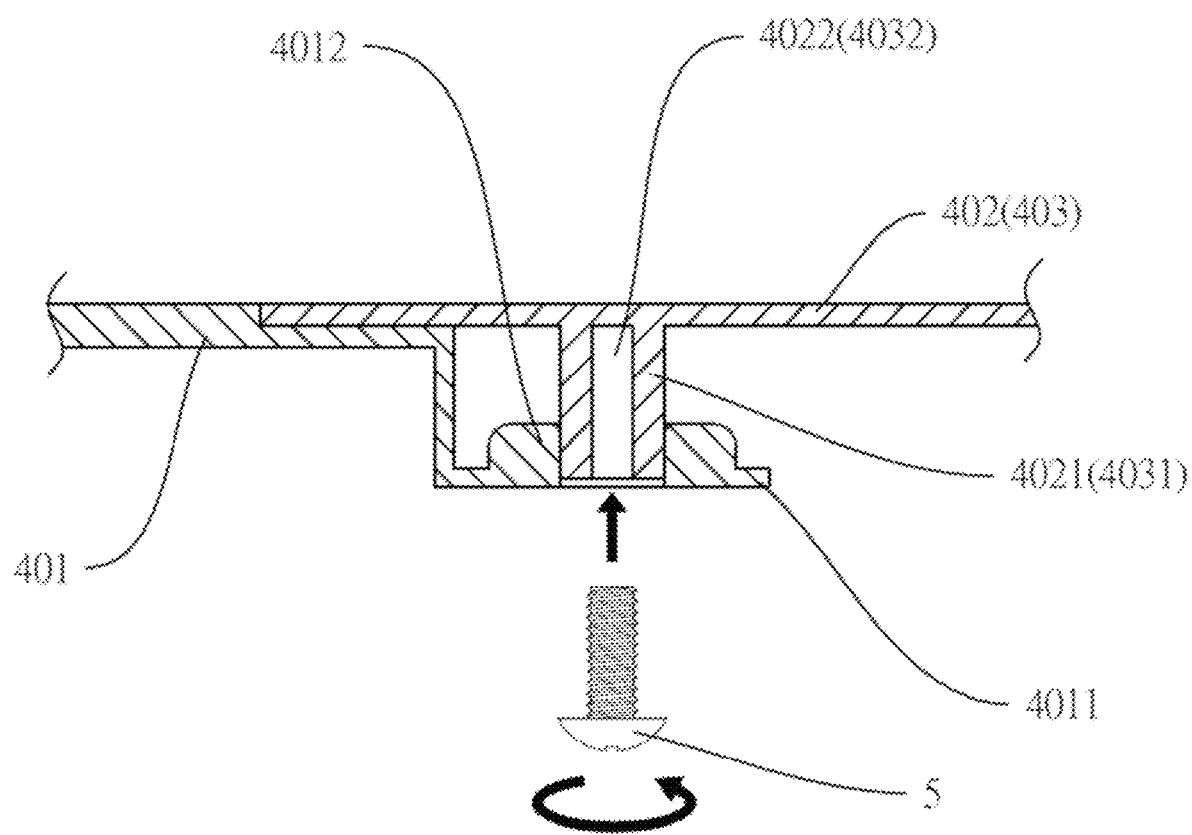
FIG. 10: Section view of the spoiler of the present invention in buckle combination.

The assembly is shown in FIG. 4, FIG. 6 and FIG. 7. First of all, the right section 402 of the present invention is integrated with midsection 401, which is to say, the plurality of cylinders 4021 in the lower part of left end of right section 402 are inserted in the buckle holes 4012 in the sheet 4011 of midsection 401, so that the sheet 4011 of the midsection 401 is put at the bottom surface of right section 402 (as shown in FIG. 9). At this point (as shown in FIG. 10), the wood screw 5 is driven in the buckle hole 4012 and the hole 4022 of cylinder 4021 which have been engaged, the right section 402 and the midsection 401 are fastened together, the assembly of right section 402 and midsection 401 is completed (as shown in FIG. 8). Afterwards, the left section 403 is integrated with the midsection 401 which has been integrated with right section 402, which is to say, the plurality of cylinders 4031 in the lower part of right end of left section 403 are inserted in the buckle holes 4012 in the sheet 4011 of midsection 401, so that the sheet 4011 of the midsection 401 is put at the bottom surface of left section 403 (as shown in FIG. 9). At this point (as shown in FIG. 10), the wood screw 5 is driven in the buckle hole 4012 and the hole 4032 of cylinder 4031 which have been engaged, so that the left section 403 and midsection 401 are screwed up, the assembly of left section 403 and midsection 401 is completed (as shown in FIG. 5), the assembly of the spoiler structure device of the present invention is completed.

Figure 11:
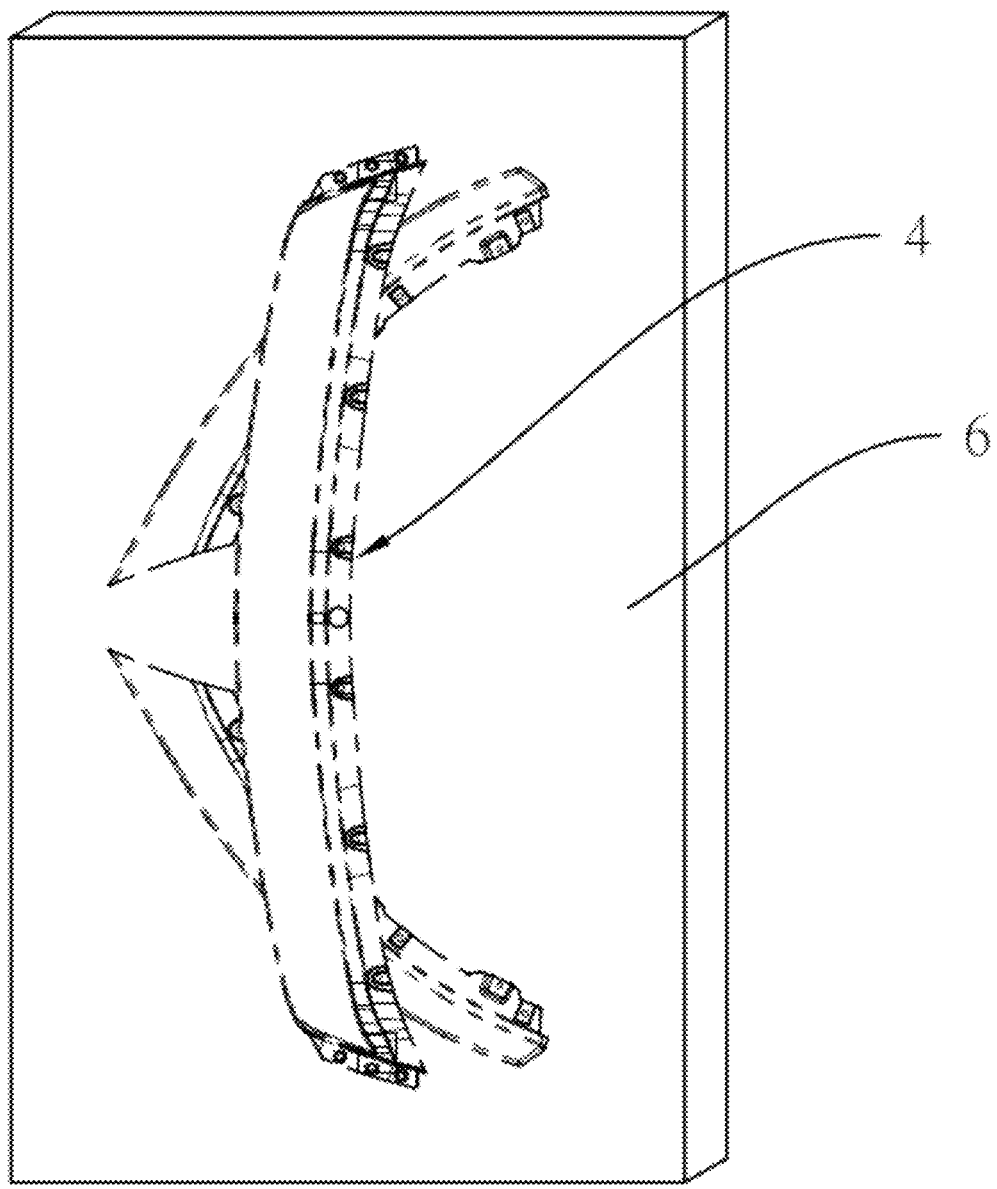
FIG. 11: Schematic diagram of the spoiler of the present invention packed in transportation.

As shown in FIG. 11, the spoiler structure of the present invention can be separated into three single parts, when it is bought by a consumer or to be packed and delivered by a supplier, the three single parts of the present invention can be piled up and packed, so that the size of the box 6 for loading the spoiler 4 of the present invention is reduced by about 50%. It is convenient for the consumer to pick up and for mailing, it does not take much space, and the mailing cost is reduced, the delivery cost is reduced for the suppliers.

Figure 12:
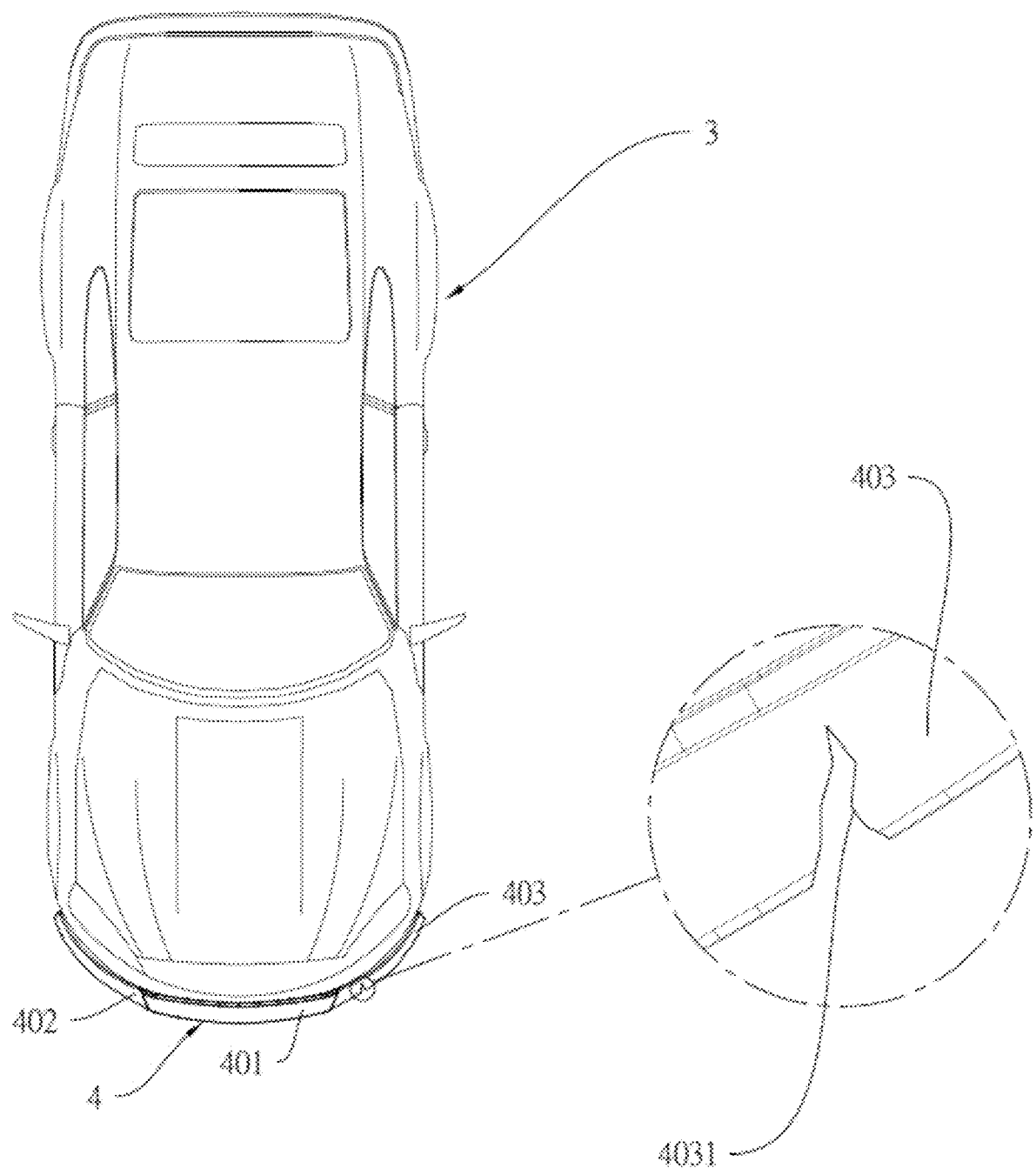
FIG. 12: Schematic diagram of the spoiler of the present invention in operating state.

The operation is shown in FIG. 12. When the spoiler 4 of the present invention is assembled as stated above, it is screwed in the bottom edge of front bumper of vehicle 3. In the course of operation, if any collision or any breakage 4033 occurs, the consumer does not need to change the whole spoiler 4, only the damaged part of spoiler 4 shall be changed. Which is to say, only the damaged part of right section 402, midsection 401 and left section 403 will be changed, so that the replacement charge can be reduced for consumers, and the consumers are more willing to change the damaged part, as it is unnecessary to change the whole structure, there will not be suspension which results in poor appearance and unsafety of vehicles.

To sum up, the structure improvement of automobile spoiler of the present invention is designed by the inventor of the present invention with meticulous mental effort, it has a particular, simple and easily assembled structure, and it is characterized by innovation thinking and simplified assembly, meeting the essentials of patent for invention of Patent Act. Therefore, an application is filed according to law, looking forward to the reviewers' approval, thank you.

Although the invention has been explained in relation to its preferred embodiment, it is to be understood that many other possible modifications and variations can be made without departing from the spirit and scope of the invention as hereinafter claimed.

SYMBOL DESCRIPTION

1 . . . Spoiler
101 . . . Breakage
2 . . . Box
3 . . . Vehicle
4 . . . Spoiler
401 . . . Midsection
4011 . . . Sheet
4012 . . . Buckle hole
402 . . . Right section
4021 . . . Cylinder
4022 . . . Hole
403 . . . Left section
4031 . . . Cylinder
4032 . . . Hole
4033 . . . Breakage
5 . . . Wood screw
6 . . . Box

What is claimed is:

1. A structure improvement of an automobile spoiler, comprising:
    a midsection, a right section, and a left section,
    wherein the midsection is cambered, wherein one side edge of a long side of the midsection has a first smooth cambered surface, wherein an other side edge of the long side of the midsection is located on the opposite to the first smooth cambered surface and has a plurality of holes for buckling on the vehicle body,
    wherein a right end of the midsection has a right sheet, wherein the right sheet has a plurality of right buckle holes, wherein a left end of the midsection has a left sheet, wherein the left sheet is symmetrical to the right sheet and located at left end of the midsection, wherein the left sheet has a plurality of left buckle holes, wherein the right section is cambered, wherein one side edge of a long side of the right section has a second smooth cambered surface, wherein the second smooth cambered surface is engageable with the first smooth cambered surface of the midsection in an integrated manner, wherein an other side edge of the long side of the right section is located opposite to the second smooth cambered surface and has a plurality of holes for buckling on the vehicle body, wherein a lower part of a left end of the right section has a plurality of right cylinders, wherein a hole is provided in a center of each of the plurality of right cylinders, wherein the plurality of right cylinders is insertable in a buckle hole in the first sheet of the midsection so that the first sheet of the midsection is put at a bottom surface of the right section, wherein the left section is arranged symmetrically to the right section, wherein one side edge of a long side of the left section has a third smooth cambered surface, wherein the third smooth cambered surface is engageable with the first smooth cambered surface of the midsection in an integrated manner, wherein an other side edge of the long side of the left section is located on the opposite to the third smooth cambered surface and has a plurality of holes for buckling the vehicle body, wherein a lower part of a right end of the left section has a plurality of left cylinders, wherein a hole is provided in a center of each of the plurality of left cylinders, wherein the plurality of left cylinders is insertable in the buckle hole in the first sheet of the midsection so that the first sheet of the midsection is put at a bottom surface of the left section.

\* \* \* \* \*